UNITED STATES PATENT OFFICE.

FRANCIS M. WILLETT, OF INDIANAPOLIS, INDIANA.

TIRE-FILLING COMPOUND.

No. 927,304.     Specification of Letters Patent.     Patented July 6, 1909.

Application filed February 26, 1909. Serial No. 480,152.

*To all whom it may concern:*

Be it known that I, FRANCIS M. WILLETT, a citizen of the United States, residing at Indianapolis, in the county of Marion and State of Indiana, have invented new and useful Improvements in Tire-Filling Compounds, of which the following is a specification.

My invention pertains to healing compounds for use in pneumatic or inflated tires such as employed on the wheels of automobiles and other vehicles; and it has for its object to provide a simple, easily prepared and inexpensive compound adapted to be quickly and easily injected into a tire and to remain in a soft or viscous state in the tire so as not to detract from the resiliency or springiness thereof, with the result that the tire is possessed of the advantages common to ordinary pneumatic tires but lacks the disadvantages of such tires.

With the foregoing in mind the invention in all of its details will be fully understood from the following description and claim.

My novel healing compound consists of the following ingredients, combined in the proportions stated, viz:

Glue _____ 1½ gallons.
    Syrup _____ 1 gallon.
    Glycerin _____ ½ pint.
    Venice turpentine_____ 1 ounce.

In the preparation of the compound the glue is steeped in water until it is pliant, and is then well drained and melted. At this time the syrup preferably common corn syrup such as used on the table, is added to and commingled with the glue, and the mixture is cooked for approximately one hour; the glycerin and the Venice turpentine being added to the mixture a short time, say two or three minutes, before the mixture is removed from the fire.

The compound may be put into a tire in any approved manner without affecting my invention. I prefer, however, to use air under pressure to force the compound into the tire, and this in a slow and steady manner while the composition is still warm. Of course before the tire is charged with the compound any punctures that may be in the tire are plugged, and provision is made for the escape of air from the tire during the charging thereof with the compound. Then when the composition appears at the outlet for air and indicates that the tire is full of the compound, I close the said outlet in any suitable manner and put on the desired pressure. The soft or viscous compound placed in the tire as stated will of itself adhere to the tire and consequently there is no liability of the compound moving in the tire and detracting from the usefulness thereof.

It will be gathered from the foregoing that my novel compound is simple and inexpensive, and is adapted to be manufactured with facility and to be readily injected into a tire without the necessity of employing an expensive apparatus. It will also be gathered that when properly added to a tire, the compound weighs less than half a corresponding body of solid rubber and hence does not render the tire unduly heavy or detract in an appreciable measure from the resiliency or springiness thereof. I would also have it understood that the cooking of the glue and syrup together in the manner hereinbefore described in detail, is essential to the preservation of the compound in a viscous state in the tire, and I would also have it understood that experiments have demonstrated that the best results are produced when the ingredients are combined in the specific proportions hereinbefore specified.

Having described my invention, what I claim and desire to secure by Letters-Patent, is:

The herein described compound for filling tires, consisting of a cooked mixture of one and one-half gallons of glue and one gallon of syrup, to which cooked mixture small quantities of glycerin and turpentine are added, substantially as described.

In testimony whereof I have hereunto set my hand in presence of two subscribing witnesses.

FRANCIS M. WILLETT.

Witnesses:
    JOHN F. SCHAFER,
    ENOCH L. ECKSTEIN.